Oct. 13, 1925.  A. T. RAMSDELL  1,556,628

FRUIT PICKER

Filed Sept. 14, 1922

INVENTOR
Alvah T. Ramsdell
by his attorney
Warren G. Ogden

Patented Oct. 13, 1925.

1,556,628

UNITED STATES PATENT OFFICE.

ALVAH T. RAMSDELL, OF DOVER, NEW HAMPSHIRE.

FRUIT PICKER.

Application filed September 14, 1922. Serial No. 588,167.

*To all whom it may concern:*

Be it known that I, ALVAH T. RAMSDELL, a citizen of the United States, residing at Dover, in the county of Strafford and State of New Hampshire, have invented certain new and useful Improvements in Fruit Pickers, of which the following is a specification.

The invention to be hereinafter described relates to fruit pickers, and more particularly to means for receiving the fruit as it is picked and for conducting the fruit down to a basket or other collecting receptacle without injury to the fruit.

In carrying the invention into practical effect, the embodiment thereof illustrated herein comprises a pole carrying a severing device and a tube for conducting the picked fruit from the severing device down along and adjacent to the pole for delivery into the collecting receptacle.

The tube is so connected to the pole as to provide a pair of pockets, one to check the fruit in the course of its transit through the tube, and the other to receive the fruit from the checking pocket in readiness for delivery to the collecting receptacle. The construction is such that the checking pocket will automatically arrest the fruit without requiring attention of the operator. When it is desired to pass the fruit to the receiving pocket which may be at the end of the tube, it is merely necessary for the operator to pull the tube slightly upward, thereby manipulating the checking pocket so as to discharge the fruit therefrom, and when it is desired to pass the fruit from the receiving pocket to the collecting receptacle, it is merely necessary for the operator to pull the tube slightly further upward, thereby so manipulating the receiving pocket as to discharge the fruit therefrom.

The character of the invention will be best understood by reference to the following description of one good form of the invention disclosed in the accompanying drawing, wherein:

Fig. 1 is a side elevation of the fruit picker shown herein as embodying the invention;

Fig. 2 on an enlarged scale is a detail of the severing device and the guide for facilitating presentation of the severing device to the stems of the fruit to be picked.

Fig. 3 on an enlarged scale is a sectional detail taken on line 3—3 of Fig. 1;

Figures 1, 2, 3, 4, 5, 6:
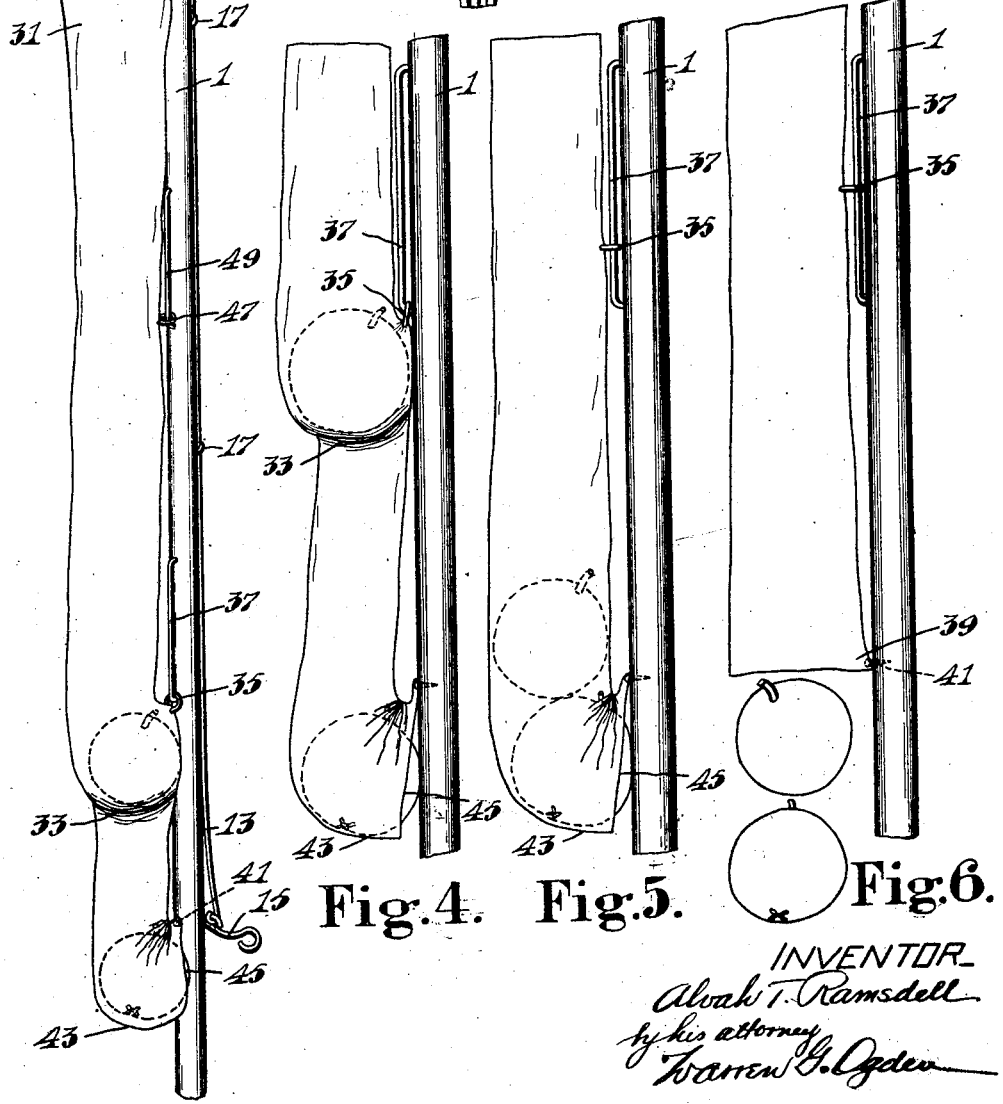
Fig. 4 is an elevation of a portion of the pole and the tube illustrating the positions of the pockets when actively supporting fruit.
Fig. 5 is a view illustrating the position of the tube after it has been pulled up somewhat to pass the fruit from the checking pocket to the end pocket.
Fig. 6 is a view illustrating the position of the tube after it has been further pulled up to discharge the fruit from the end pocket.

Referring to the drawing, the fruit picker shown therein as one good form of the invention, comprises a pole 1 of any convenient length having at the upper end thereof a severing device, in the present instance, comprising a fixed blade 3 and a movable blade 5 pivotally mounted on a bolt 7 carried by the fixed blade. The movable blade is urged to its open position by a coil spring 9 having one end connected to the fixed blade and its opposite end connected to the movable blade. Projecting from the movable blade is an arm 11 connected to a rod 13 which extends downward along the pole and is connected to an actuating handle pivotally mounted on the pole. The rod may be guided by eyes 17 secured to the pole.

Suitable means may be provided to support the severing device and to facilitate presentation thereof to the stems of the fruit to be picked. This means, in the present instance, comprises a fork having arms 19 conveniently formed of wire loops providing a V-shaped mouth 21 leading to the opening between the blades of the severing device. The end portions of the wire loops are carried downward to provide legs 23 which extend along a tapered end portion of the pole, and are secured thereto by wire serving 24.

The fixed blade of the severing device may be secured to the wire loops by a pair of bolts 25 which may be provided with clamps to embrace the portions of the wire loops back of the fixed blade, and assist in holding the loops in proper position to maintain the mouth 21 in desired relation with respect to the severing device.

In picking fruit, the severing device is presented to the stem of the fruit, as indicated in Fig. 1, the mouth 21 desirably serving to guide the stem to the opening between the blades of the severing device. Then the operator may pull the actuating handle 15 downward, thereby drawing the rod 13 downward and rocking the arm 11 to cause the movable blade 5 to rock toward the fixed blade and sever the stem.

Having described the severing device, next will be described the means for receiving the fruit from the severing device and for conducting it to a delivery point without bruising or causing other injury to the fruit.

This means, in the present instance of the invention, comprises an upper ring 27 formed of wire and bent to present a pair of legs 29 which may extend downward along the upper tapered portion of the pole in opposition to the legs 23 referred to, of the guiding device, and the legs 29 may be secured to the pole by the wire serving 24 which serves to secure the legs 23 to the pole.

Stitched or otherwise secured to the ring 27 is a tube 31 of fabric or other suitable material. The tube depends downward from the ring 27 and extends along the pole closely adjacent thereto.

To provide a pocket 33 for checking the fruit, the tube may be caught up by an eye 35 connected to the pole by a bail or guide 37. The length of the tube from its supporting ring 27 to the eye 35 is somewhat greater than the distance from the supporting ring to the lower end of the bail 37. The consequence is that when the eye 35 gravitates downward to and rests on the lower end of the bail, the portion of the tube next to the pole is caught upward by the eye 35, causing the tube to sag and form the pocket 33. As a result, when the fruit gravitates from the severing device downward through the tube, it will be caught and arrested by the pocket 33.

To form the end or delivery pocket, the edge 39 of the tube adjacent to the pole is fastened to the pole by a nail 41 or other suitable securing means. The length of the tube is somewhat greater than the distance between the nail 41 and the tube supporting ring 27. The consequence is that the lower end of the tube is caught up, causing the lower end portion thereof to sag or bag downward and form a pocket 43 having an opening 45 normally facing the pole.

The tube may be further connected to the pole by an eye 47 carried by a bail or guide 49 secured to the pole at a point between the tube supporting ring and the bail 37 referred to.

In use, when the fruit is severed from its stem as described, the fruit will drop through the ring 27 downward through the tube 31 until it is checked and arrested by the pocket 33 which is intermediate the ring and the end pocket 43, and preferably a short distance above the latter.

After the fruit has entered the checking pocket, the operator may grasp the tube with his hand at a point above the checking pocket, and on exerting a slight upward pull on the tube, the bag in the tube forming the pocket 23 will be straightened as shown in Fig. 5, thereby discharging the fruit from the checking pocket into the end pocket.

When it is desired to deliver the fruit from the end pocket into the basket or other collecting receptacle, the operator may exert a slight further upward pull on the tube, thereby straightening the same so as to remove the bag in the tube forming the pocket 43, as shown in Fig. 6, and allowing the fruit to be delivered from said pocket.

The distance between the checking and end pockets may be sufficient to allow more than one article to be collected in the end pocket before discharging the same therefrom, but the distance between the two pockets is so slight that the fruit in dropping from the upper to the lower pocket will not have sufficient impact to bruise or otherwise injure the same.

After the tube has been pulled up to discharge the fruit from the checking pocket to the end pocket, on release of the tube, it will naturally gravitate downward again to form the checking pocket which will be in readiness to check the next fruit picked. Also, after the tube has been pulled up sufficiently to deliver the fruit from the end pocket, on release of the tube, it will naturally gravitate downward and form the end pocket.

The pole may be held in both hands of the operator, and his upper hand while supporting the pole may be employed to pull the tube upward to control the discharge of the fruit from the pockets as described.

While in the illustrated embodiment of the invention, a severing device has been shown provided with relatively movable blades for cutting the stems of fruit, it will be understood that in some cases a severing device may be employed which may snap off the fruit from its stem by a twisting or other manipulation of the device, and the tube described may be employed for checking and delivering the fruit which is picked by such a device.

If it is desired to substitute a new tube for an old one, this may be readily accomplished by pulling the ring 27 upward, thereby withdrawing its legs 29 from the embrace of the wire serving 24, and then the legs of the ring of a new tube may be inserted in the serving.

It will be understood that the invention is not limited to the specific embodiment shown, and that various deviations may be made without departing from the spirit and scope of the appended claims.

What is claimed is:

1. A fruit picker comprising a pole, a device thereon for severing fruit from its stem, a fabric tube extending along the pole having an opening at the upper end thereof for receiving the fruit from the severing device and an opening at the lower end of the tube for delivering the fruit, means to secure the inner edge of the lower end of the tube to the pole to hold the delivery opening substantially vertical and form a fruit receiving and holding pocket, and means connected to the pole to catch up a portion of the tube at a short distance above the lower end thereof to form a fruit checking and holding pocket, the latter being adapted to deliver fruit to the receiving pocket on upward pull on the tube, and the receiving pocket being adapted to discharge fruit from the delivery opening on further upward pull on the tube.

2. A fruit picker comprising a pole, a device thereon for severing fruit from the stem, an open-ended tube carried by the pole for receiving the fruit from the severing device and for conducting the same downward along the pole, fixed means connecting the pole side of the edge of the lower open end of the tube to the pole at a distance from the upper end of the tube less than the length of the tube to provide a sag and form a fruit receiving and holding pocket that is closed by the pole, and sliding means for catching up and securing a portion of the tube to the pole at a point intermediate the ends of the tube to form a fruit checking and holding pocket, said pockets being adapted to progressively deliver the fruit therefrom on application of an upward pull to the tube, permitted by said sliding means, until drawn taut against the pole by resistance from said fixed means.

3. A fruit picker comprising a pole, a severing device at the upper end thereof for separating the fruit from its tree, a wire loop guide for guiding a stem to the severing device and having legs extending along the upper end portion of the pole, a ring having legs extending along the upper end portion of the pole, wire serving for securing all of said legs to the pole, and a tube carried by the ring and extending downward therefrom along the pole for receiving the fruit from the severing device and for conducting the same downward to the lower end of the tube.

ALVAH T. RAMSDELL.